UNITED STATES PATENT OFFICE.

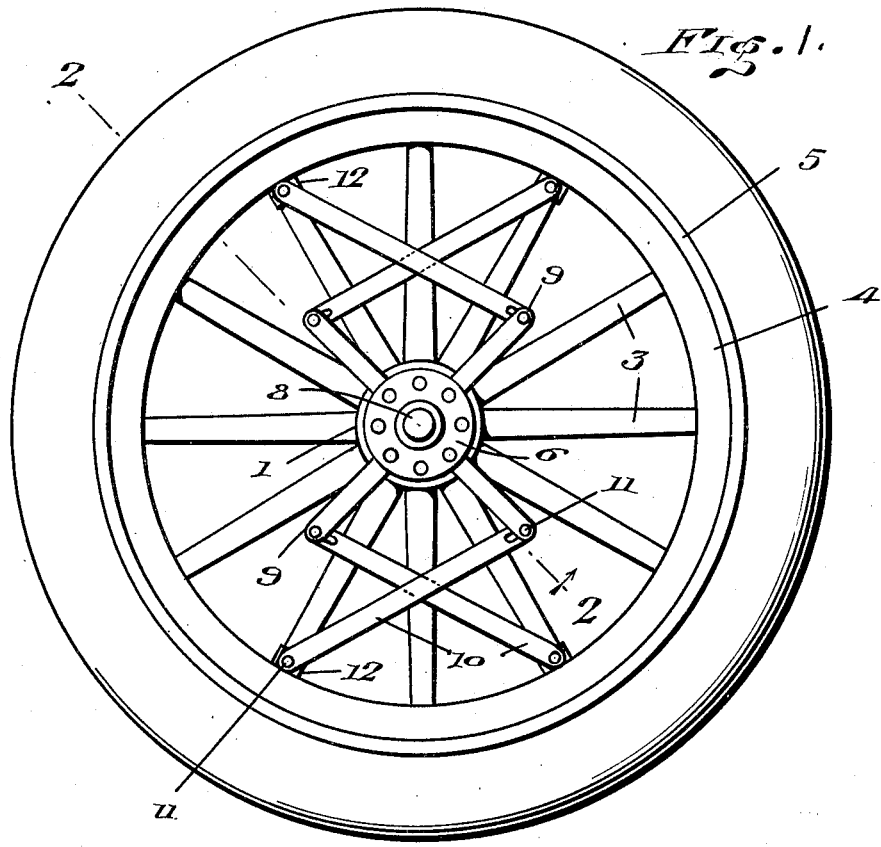
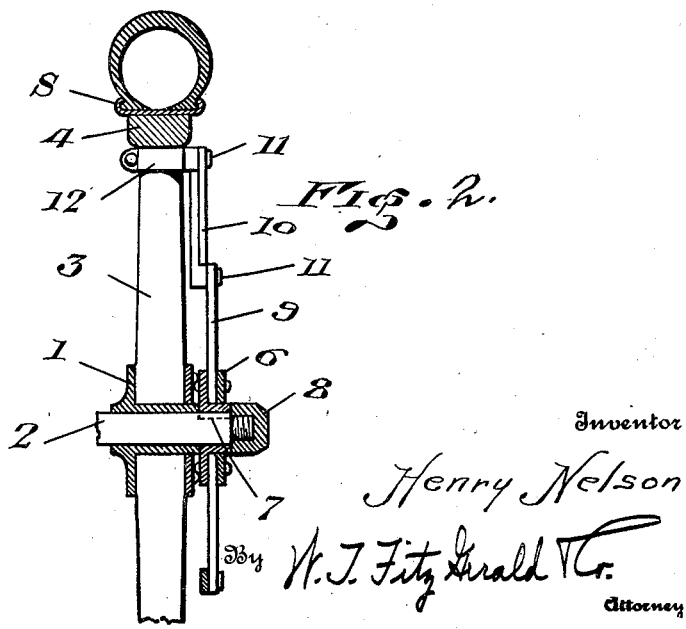

HENRY NELSON, OF BELOIT, WISCONSIN.

WHEEL-DRIVE.

1,375,259.  Specification of Letters Patent.  Patented Apr. 19, 1921.

Application filed May 23, 1919. Serial No. 299,191.

*To all whom it may concern:*

Be it known that I, HENRY NELSON, citizen of the United States, residing at Beloit, in the county of Rock and State of Wisconsin, have invented certain new and useful Improvements in Wheel-Drives; and I do hereby declare the following to be a full, clear, and exact description of the invention, such as will enable others skilled in the art to which it appertains to make and use the same.

The present invention relates to an improved means for transmitting the power from an axle or shaft to the rim of a wheel thereon, especially when such wheel comprises a hub and spokes secured to the hub, in order that the improved construction will relieve the inner ends of the spokes of the twisting strain, thereby avoiding the breakage of the spokes or the weakening of the wheel by transmitting the power through the hub and spokes as usual.

The object of the invention is the provision of novel means for connecting the axle or shaft with the wheel near the rim thereof or outer ends of the spokes, in order to transmit the power in an efficient manner, and to also relieve the hub and inner ends of the spokes of the great strain to which they are ordinarily subjected when the hub is made fast on the axle or shaft.

It is also the object of the invention to provide such a device which will be simple and inexpensive in construction, and which can be readily assembled with or incorporated in vehicle wheels, pulley wheels, and the like.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein—

Figure 1 is a side elevation of a vehicle wheel showing the device applied.

Fig. 2 is a diametrical section on the line 2—2 of Fig. 1, portions being broken away and portions shown in elevation.

The device is illustrated in the drawing, as being applied to an ordinary vehicle wheel, although it can be applied to pulley wheels and the like. The wheel illustrated embodies the hub 1 mounted loosely on the axle or shaft 2 so as to be free therefrom, whereby the axle or shaft in turning will not drive the hub 1 direct, and thus the inner ends of the spokes 3 which are secured in the hub 1 are relieved of the considerable strain to which they are ordinarily subjected in a driving or propelling wheel. A felly 4 is secured on the spokes 3 as usual, and carries the rim 5 for the tire. (Not shown.)

The driving device is located at the outside of the vehicle wheel, and comprises a suitable hub 6 fastened on the axle or shaft 2, by means of a suitable key 7, and said hub 6 fits up against the hub 1, and the two hubs can be assembled in any desired manner so as to fit snugly together in compact relation. The hub 6 is held on the axle or shaft by means of a cap nut 8 screwed on the end of the axle, and flat spoke bars 9 have their inner ends secured within the hub 6, which may be composed of side plates between which said bars are clamped by means of rivets or the like. The bars 9 are connected at their outer ends to the wheel near the rim thereof, and transmit the power from the axle 2 and hub 6 to the wheel in such a manner, that the rim is driven without the power going through the wheel hub 1 and inner ends of the spokes 3 as usual, thereby relieving them of the breaking strain.

The bars 9 are shorter than the spokes 3, and are connected by links 10 to clamps 12 embracing some of the spokes near the felly, said links extending in opposite directions and crossing one another and having their inner and outer ends pivoted, as at 11, to the arms 9 and clamps 12, respectively. Said links transmit the strain from the arms 9 to the felly and rim, and said arms being pivoted to the links and the links in turn pivoted to the clamps, will enable the device to adjust itself to the conditions as well as permitting the device to be installed on various wheels.

With the present construction, the spokes 3 and hub 1 can be reduced in size, as they are relieved of the twisting strain as when made secure to the axle or shaft, and the secondary hub 6 is used for transmitting the power from the axle or shaft, and with the bars or members 9 form a spider secured at its center to the axle or shaft and at its terminals to the wheel near the rim thereof for driving said rim with maximum power. The construction is simple and substantial, being readily applicable to the wheels of automobiles, trucks, tractors, and in fact all similar wheels used for transmitting power. The bars 9 are so arranged as to move edgewise in rotating. Therefore, although said bars can be bent toward or away from the wheel in applying the driving device, the bars will not bend in the direction of rotation.

Having thus described the invention, what is claimed as new is:—

1. A wheel structure having in combination, a shaft, a wheel mounted loosely thereon, a driving hub secured from the shaft, bars extending from said hub, and bars extending at an angle to the spokes, and pivotally connected at their inner ends to the aforesaid bars and at their outer ends to the wheel near the rim thereof.

2. A wheel structure having in combination, a shaft, a wheel having a hub mounted loosely on said shaft and having spokes, a driving hub secured on said shaft, bars secured to the driving hub and extending therefrom, clamps embracing said spokes beyond said bars, and bars extending at an angle with the spokes and pivotally connected at their inner and outer ends to the aforesaid bars and clamps, respectively.

3. A wheel structure having in combination, a shaft, a wheel having a hub, felly and spokes between the hub and felly, said wheel hub being mounted loosely on said shaft, a driving hub secured on the shaft adjacent to the wheel hub, clamps embracing said spokes, bars secured to the driving hub and extending therefrom, and bars crossing one another and pivotally connected to the aforesaid bars and clamps to secure them together.

In testimony whereof I have signed my name to this specification in the presence of two subscribing witnesses.

HENRY NELSON.

Witnesses:
 HENRY J. A. GRIESIE,
 W. E. KEYES.